United States Patent
Kim et al.

(10) Patent No.: US 10,993,255 B2
(45) Date of Patent: Apr. 27, 2021

(54) METHOD FOR PERFORMING SUB-BAND UNIT DOWNLINK SCHEDULING IN NEXT GENERATION WIRELESS COMMUNICATION SYSTEM AND APPARATUS FOR SAME

(71) Applicant: LG ELECTRONICS INC., Seoul (KR)

(72) Inventors: Hyungtae Kim, Seoul (KR); Jonghyun Park, Seoul (KR); Jiwon Kang, Seoul (KR); Kijun Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 16/482,230

(22) PCT Filed: Jan. 31, 2018

(86) PCT No.: PCT/KR2018/001306
§ 371 (c)(1),
(2) Date: Jul. 30, 2019

(87) PCT Pub. No.: WO2018/143654
PCT Pub. Date: Aug. 9, 2018

(65) Prior Publication Data
US 2020/0053764 A1     Feb. 13, 2020

Related U.S. Application Data

(60) Provisional application No. 62/501,768, filed on May 5, 2017, provisional application No. 62/452,945, filed on Jan. 31, 2017.

(51) Int. Cl.
*H04W 72/04* (2009.01)
*H04W 72/12* (2009.01)

(52) U.S. Cl.
CPC ... *H04W 72/1289* (2013.01); *H04W 72/0453* (2013.01)

(58) Field of Classification Search
None
See application file for complete search history.

(56) References Cited

U.S. PATENT DOCUMENTS

2010/0020890 A1 *  1/2010  Choi ............... H04L 25/0232
                                                375/260
2012/0008587 A1 *  1/2012  Lee, II ................. H04L 1/06
                                                370/329

(Continued)

FOREIGN PATENT DOCUMENTS

| KR | 1020130103332 | 9/2013 |
| KR | 101588731 | 1/2016 |
| WO | 2016028125 | 2/2016 |

OTHER PUBLICATIONS

PCT International Application No. PCT/KR2018/001306, Written Opinion of the International Searching Authority dated Apr. 25, 2018, 19 pages.

*Primary Examiner* — Anez C Ebrahim
(74) *Attorney, Agent, or Firm* — Lee Hong Degerman Kang Waimey

(57) ABSTRACT

Disclosed in the present application is a method for a terminal transmitting an uplink signal in a wireless communication system. Particularly, the method comprises the steps of: receiving, from the base station, allocation information for resource blocks in a wideband and information on precoders indicated in sub-band units; configuring the allocated resource blocks into sub-bands including two or more continuous resource blocks; and transmitting the uplink signal through the sub-bands to the base station by applying the precoders to corresponding sub-bands.

10 Claims, 15 Drawing Sheets

(56) References Cited

U.S. PATENT DOCUMENTS

2016/0212746 A1 7/2016 Wang et al.
2016/0227539 A1 8/2016 Ye et al.

* cited by examiner

Fig.2
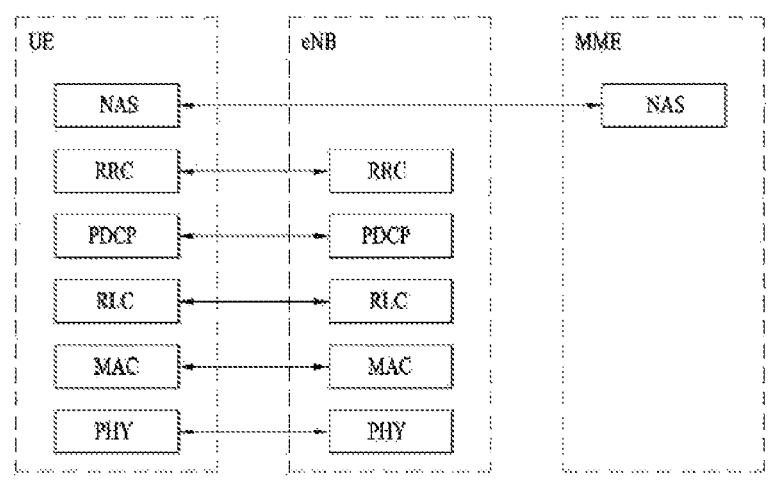
(A) CONTROL-PLANE PROTOCOL STACK
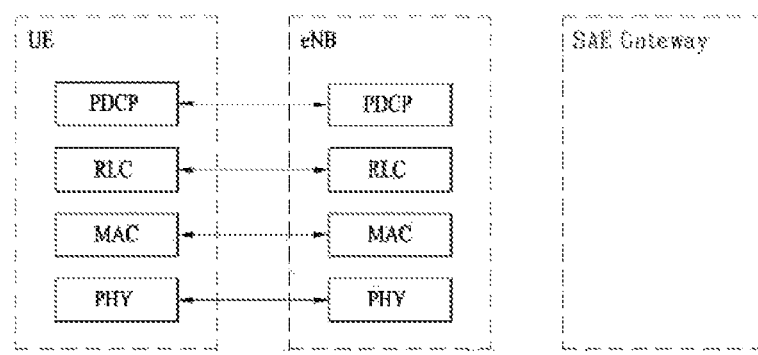
(B) USER-PLANE PROTOCOL STACK

Fig.9

| Config | Symbol index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | Dc | Dd | Dd | Dd | Dd | Dd | Dd | Dd | Dd | Dd | Dd | Dd | Dd / CSI-RS | Dd / CSI-RS |
| 1 | Dc | Dd | Dd | Dd | Dd | Dd | Dd | Dd | Dd | Dd | Dd | Dd | GP | Uc / SRS |
| 2 | Dc | Dc | Dd | Dd | Dd | Dd | Dd | Dd | Dd | Dd | Dd | Dd | Dd / CSI-RS | Dd / CSI-RS |
| 3 | Dc | Dc | Dd | Dd | Dd | Dd | Dd | Dd | Dd | Dd | Dd | Dd | GP | Uc / SRS |
| 4 | Dc | GP | Ud | Ud | Ud | Ud | Ud | Ud | Ud | Ud | Ud | Ud | Ud | Ud |
| 5 | Dc | GP | Ud | Ud | Ud | Ud | Ud | Ud | Ud | Ud | Ud | Ud | Ud | Uc / SRS |
| 6 | Dc | GP | Ud | Ud | Ud | Ud | Ud | Ud | Ud | Ud | Ud | Ud | Ud | CSI-RS |
| 7 | Dc | GP | Ud | Ud | Ud | Ud | Ud | Ud | Ud | Ud | Ud | Ud | SRS | CSI-RS |
| 8 | Dc | GP | Ud | Ud | Ud | Ud | Ud | Ud | Ud | Ud | Ud | Ud | SRS | Uc |

Fig.10
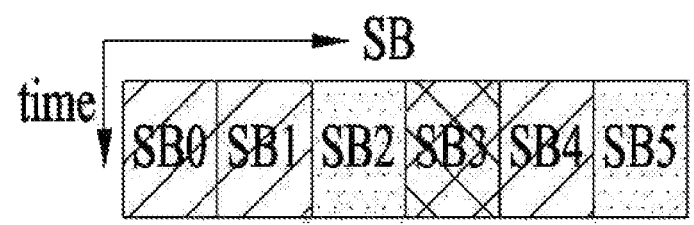
 scheduled RB for UE1
 scheduled RB for UE2
 scheduled RB for UE3

Fig.11

| | UE specific 1st DCI | | | | | | | Common 2nd DCI |
|---|---|---|---|---|---|---|---|---|
| UE1 | Rsc allocation | UE scheduling information (e.g. DMRS info,NDI,RV,ect) | WB MCS, SB MCS | WB PMI with rank | SB PMI bitwidth | SB size | WB mode | CRC |
| UE2 | Rsc allocation | UE scheduling information (e.g. DMRS info,NDI,RV,ect) | WB MCS, SB MCS | WB PMI with rank | SB PMI bitwidth | SB size | WB mode | CRC | SB0 PMI / SB1 PMI / SB2 PMI / SB3 PMI / SB4 PMI / SB5 PMI / CRC |
| UE3 | Rsc allocation | UE scheduling information (e.g. DMRS info,NDI,RV,ect) | WB MCS, SB MCS | WB PMI with rank | SB PMI bitwidth | SB size | WB mode | CRC | N.A. |

Fig.12

| | UE specific 1st DCI | | | | | | | UE specific 2nd DCI | | | | |
|---|---|---|---|---|---|---|---|---|---|---|---|---|
| UE1 | Rsc allocation | UE scheduling information (e.g. DMRS info,NDI,RV,ect) | WB MCS | WB PMI with rank | SB size | WB mode | C R C | SB0 PMI | SB1 PMI | SB4 PMI | SB MCS | C R C |
| UE2 | Rsc allocation | UE scheduling information (e.g. DMRS info,NDI,RV,ect) | WB MCS | WB PMI with rank | SB size | WB mode | C R C | SB2 PMI | SB5 PMI | SB MCS | | C R C |
| UE3 | Rsc allocation | UE scheduling information (e.g. DMRS info,NDI,RV,ect) | WB MCS | WB PMI with rank | SB size | WB mode | C R C | N.A. | | | | |

Fig.13

| | UE specific 1st DCI | | | | | | UE specific 2nd DCI | | | | | | | |
|---|---|---|---|---|---|---|---|---|---|---|---|---|---|---|
| UE1 | Rsc allocation | UE scheduling information (e.g. DMRS info,NDI,RV,ect) | MCS | WB PMI with rank | WB mode | CRC | SB0 PMI | SB1 PMI | SB2 PMI | SB3 PMI | SB4 PMI | SB5 PMI | SRS req. | CRC |
| UE2 | Rsc allocation | UE scheduling information (e.g. DMRS info,NDI,RV,ect) | MCS | WB PMI with rank | WB mode | CRC | SB0 PMI | SB1 PMI | SB2 PMI | SB3 PMI | SB4 PMI | SB5 PMI | SRS req. | CRC |
| UE3 | Rsc allocation | UE scheduling information (e.g. DMRS info,NDI,RV,ect) | MCS | WB PMI with rank | WB mode | CRC | SB0 PMI | SB1 PMI | SB2 PMI | SB3 PMI | SB4 PMI | SB5 PMI | SRS req. | CRC |

Fig.14

| | UE specific 1st DCI | | | | | UE specific 2nd DCI | | | | | | | | | | |
|---|---|---|---|---|---|---|---|---|---|---|---|---|---|---|---|---|
| UE1 | Codebook subset restriction for SB PMI | SB PMI bitwidth | SB size | WB PMI with rank | CRC | Rsc allocation | UE scheduling information (e.g. DMRS info,NDI,RV,ect) | MCS | WB mode | SB0 PMI | SB1 PMI | SB2 PMI | SB3 PMI | SB4 PMI | SB5 PMI | SRS req. | CRC |
| UE2 | Codebook subset restriction for SB PMI | SB PMI bitwidth | SB size | WB PMI with rank | CRC | Rsc allocation | UE scheduling information (e.g. DMRS info,NDI,RV,ect) | MCS | WB mode | SB0 PMI | SB1 PMI | SB2 PMI | SB3 PMI | SB4 PMI | SB5 PMI | SRS req. | CRC |
| UE3 | Codebook subset restriction for SB PMI | SB PMI bitwidth | SB size | WB PMI with rank | CRC | Rsc allocation | UE scheduling information (e.g. DMRS info,NDI,RV,ect) | MCS | WB mode | SB0 PMI | SB1 PMI | SB2 PMI | SB3 PMI | SB4 PMI | SB5 PMI | SRS req. | CRC |

METHOD FOR PERFORMING SUB-BAND UNIT DOWNLINK SCHEDULING IN NEXT GENERATION WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2018/001306, filed on Jan. 31, 2018, which claims the benefit of U.S. Provisional Application No. 62/452,945, filed on Jan. 31, 2017 and 62/501,768, filed on May 5, 2017, the contents of which are all hereby incorporated by reference herein in their entireties.

TECHNICAL FIELD

The present invention relates to a next-generation wireless communication system and, more particularly, to a method of performing downlink scheduling in units of a subband in a next-generation wireless communication system and an apparatus therefor.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQuest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DETAILED DESCRIPTION OF THE INVENTION

Technical Problems

Based on the above-described discussion, the present invention provides a method of performing downlink scheduling in units of a subband in a next-generation wireless communication system and an apparatus therefor.

Technical Solutions

According to an aspect of the present invention, provided herein is a method of transmitting an uplink signal by a user equipment (UE) to a base station (BS) in a wireless communication system, including receiving information about resource blocks allocated in a wideband and information about precoders indicated in units of a subband from the BS; configuring the allocated resource blocks as subbands including two or more contiguous resource blocks; and applying the precoders to corresponding subbands to transmit the uplink signal to the BS through the subbands.

In another aspect of the present invention, provided herein is a user equipment (UE) in a wireless communication system, including a wireless communication module; and a processor connected to the wireless communication module and configured to receive information about resource blocks allocated in a wideband and information about precoders indicated in units of a subband from a base station (BS), configure the allocated resource blocks as subbands including two or more contiguous resource blocks, and applying the precoders to corresponding subbands to transmit the uplink signal to the BS through the subbands.

Resource blocks of contiguous indexes which are equal to or less than a predetermined number from a resource block of a minimum index not configured as a subband among the allocated resource blocks may be defined as one subband. If a resource block of an index which is contiguous with the resource block of the minimum index not configured as a subband among the allocated resource blocks is not present, the resource block of the minimum index may be defined as one subband.

The information about the allocated resource blocks may be received through UE-specific first downlink control information and the information about the precoders may be received through UE-specific second downlink control information. The first downlink control information may include information about a size of subbands defined as the number of resource blocks.

Advantageous Effects

According to an embodiment of the present invention, efficient DL scheduling may be performed in units of subband in a next-generation wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 is a diagram illustrating structures of a control plane and a user plane of a radio interface protocol between a UE and an evolved UMTS terrestrial radio access network (E-UTRAN) based on the 3GPP radio access network specification.

FIG. 9 illustrates a detailed configuration example of a self-contained subframe.

FIG. 10 illustrates an example of performing UL transmission according to an embodiment of the present invention.

FIG. 11 illustrates an exemplary structure of a UL grant according to an embodiment of the present invention.

FIG. 12 illustrates another exemplary structure of a UL grant according to an embodiment of the present invention.

FIG. 13 illustrates another exemplary structure of a UL grant according to an embodiment of the present invention.

FIG. 14 illustrates another exemplary structure of a UL grant according to an embodiment of the present invention.

BEST MODE FOR CARRYING OUT THE INVENTION

Figure 1:
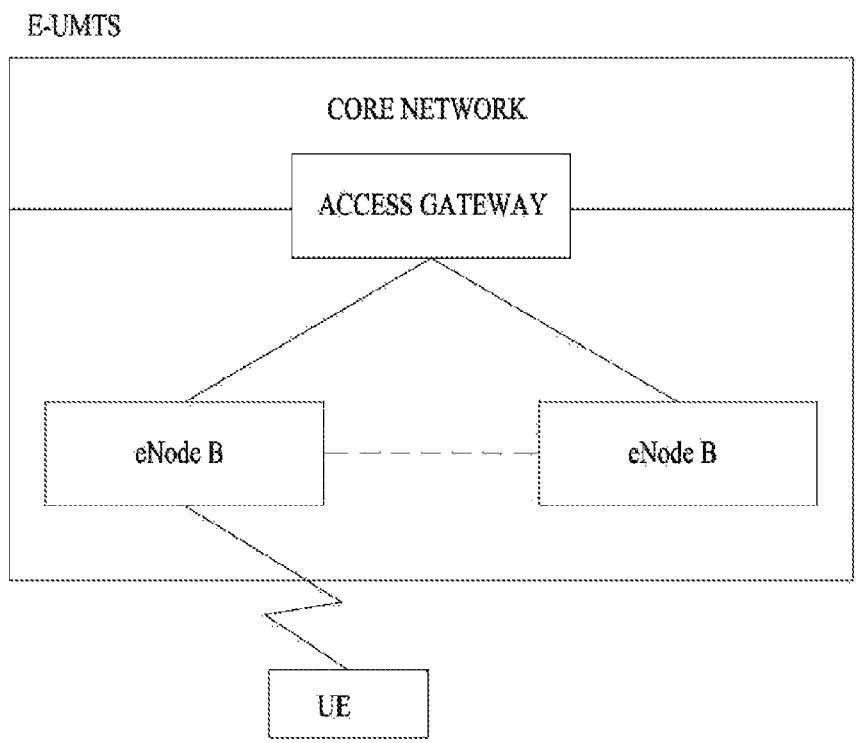
FIG. 1 is a diagram schematically illustrating a network structure of an evolved universal mobile telecommunications system (E-UMTS) as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
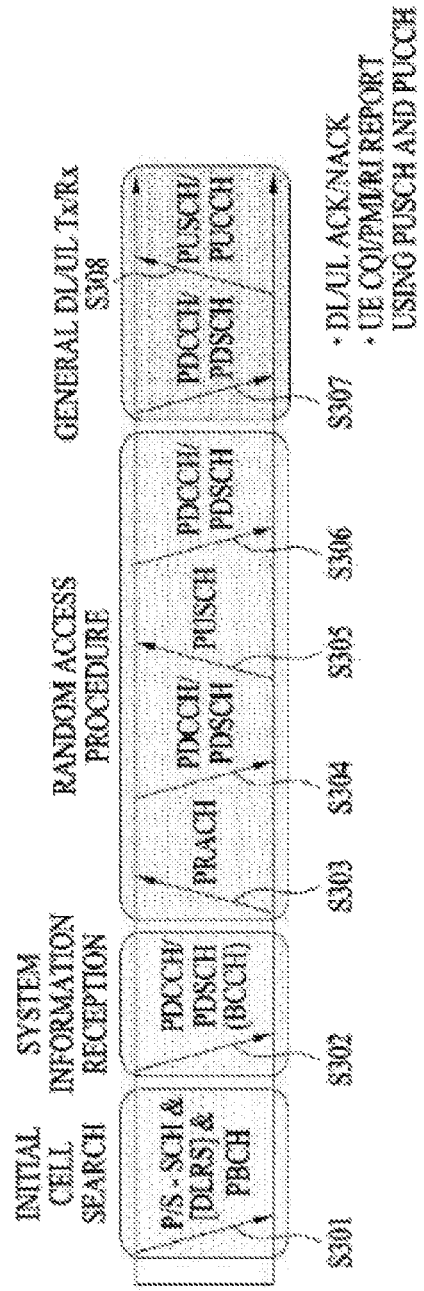
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
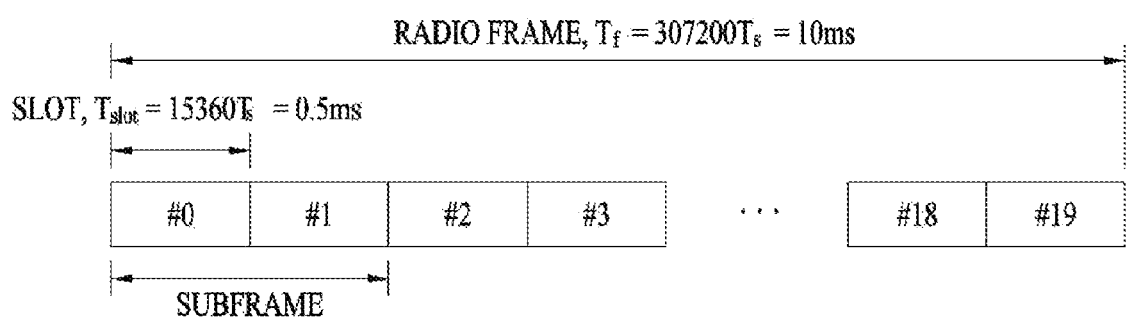
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
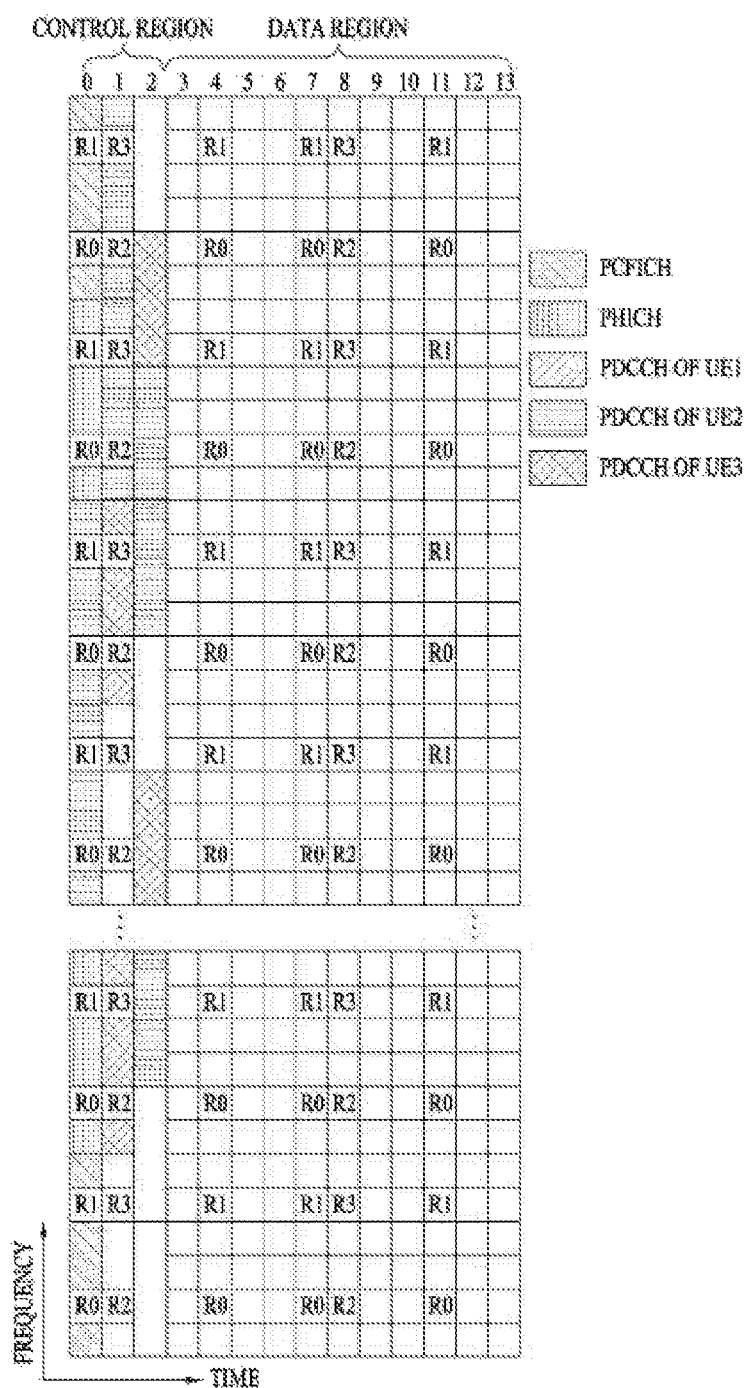
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. ne REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
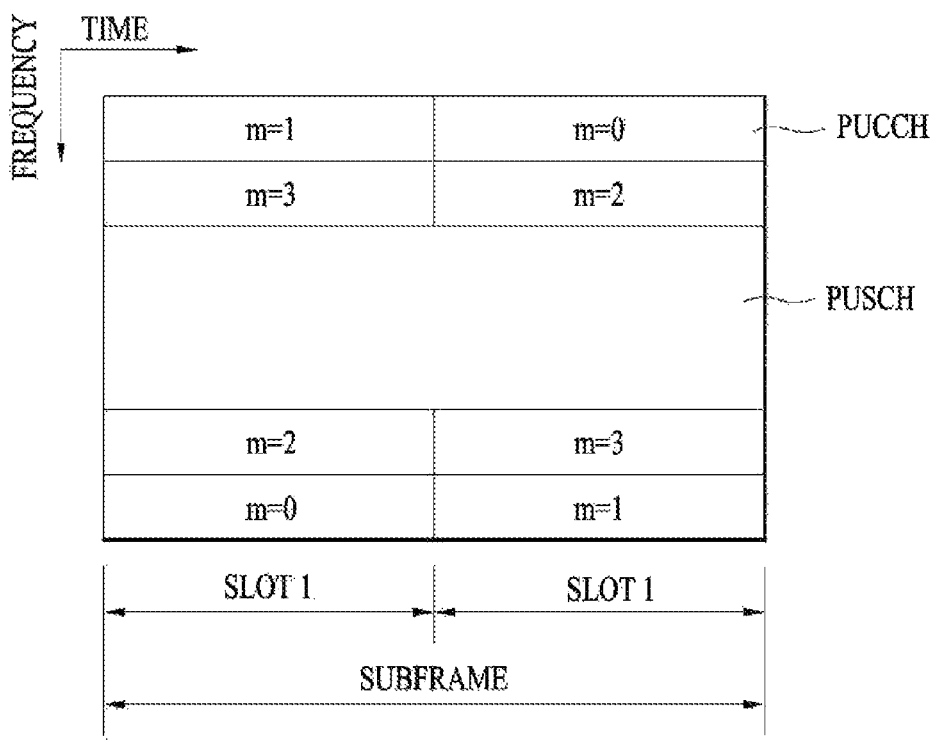
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may perform beamforming based on CSI in order to obtain multiplexing gain of MIMO antennas. To acquire CSI from the UE, the eNB allocates a PUCCH or a PUSCH to the UE and commands the UE to feed back CSI regarding a SL signal.

CSI is divided into three types of information: an RI, a PMI, and a CQI. First, RI is information on a channel rank as described above and indicates the number of streams that may be received by the UE via the same time-frequency resource. Since RI is determined by long-term fading of a channel, RI may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

In a 3GPP LTE-A system, the eNB may configure a plurality of CSI processes for the UE and receive report for CSI regarding each CSI process. Herein the CSI process includes a CSI-RS resource for measuring quality of a signal received from the eNB and a CSI-interference measurement (CSI-IM) resource for measuring interference, i.e., an interference measurement resource (IMR).

In a millimeter wave (mmW) band, wavelength is shortened, and thus a plurality of antenna elements may be installed in the same area. Specifically, a total of 64 (=8×8) antenna elements may be installed in a 4-by-4 cm panel in a 30 GHz band with a wavelength of about 1 cm in a 2-dimensional array at intervals of 0.5λ (wavelength). Therefore, in mmW, increasing coverage or throughput by increasing beamforming (BF) gain using multiple antenna elements has recently been taken into consideration.

If a transceiver unit (TXRU) is provided for each antenna element to enable adjustment of transmit power and phase, independent BF is possible for each frequency resource. However, installing TXRU in all of the about 100 antenna elements is less feasible in terms of cost. Therefore, a method of mapping multiple antenna elements to one TXRU and adjusting the direction of a beam using an analog phase shifter is under consideration. This analog BF method may make only one beam direction in the whole band, and thus may not perform frequency selective BF, which is disadvantageous.

Hybrid BF using B TXRUs less in number than Q antenna elements may be considered as an intermediate type of digital BF and analog BF. In this case, the number of beam directions in which beams may be transmitted at the same time is limited to B or less, which depends on a connection method of B TXRUs and Q antenna elements.

Figure 7:
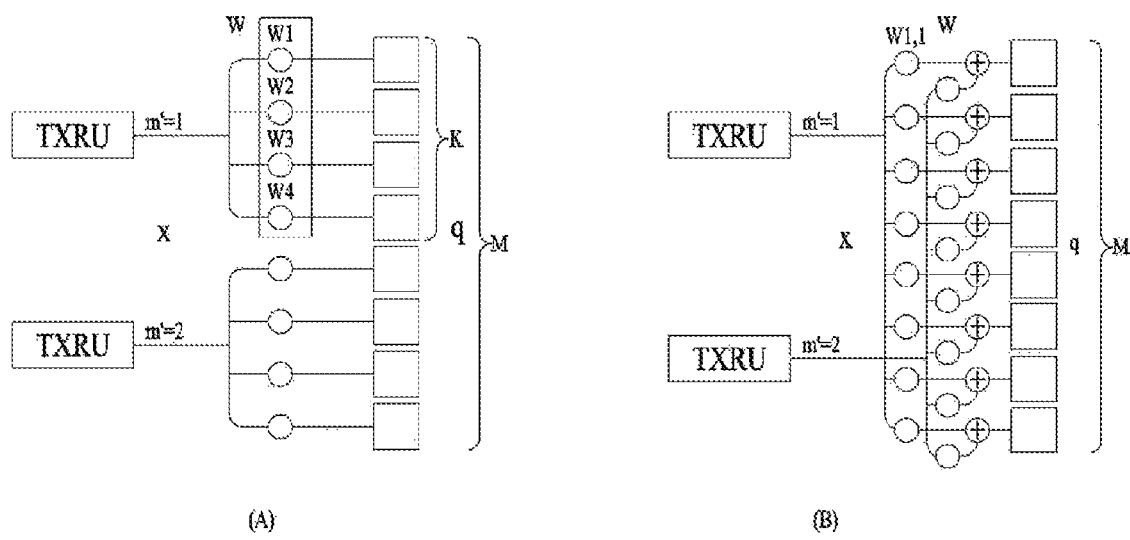
FIG. 7 illustrates exemplary connection schemes between TXRUs and antenna elements.

FIG. 7 illustrates exemplary connection schemes between TXRUs and antenna elements.

(a) of FIG. 7 illustrates connection between a TXRU and a sub-array. In this case, an antenna element is connected only to one TXRU. In contrast, (b) of FIG. 7 illustrates connection between a TXRU and all antenna elements. In this case, an antenna element is connected to all TXRUs. In FIG. 7, W represents a phase vector subjected to multiplication in an analog phase shifter. That is, a direction of analog BF is determined by W. Herein, CSI-RS antenna ports may be mapped to TXRUs in a one-to-one or one-to-many correspondence.

As more communication devices have demanded higher communication capacity, there has been necessity of enhanced radio broadband communication relative to legacy radio access technology (RAT). In addition, massive machine type communication (MTC) for providing various services anytime and anywhere by connecting a plurality of devices and objects to each other is also one main issue to be considered in next-generation communication. Further, a communication system to be designed in consideration of services/UEs sensitive to reliability and latency is under discussion. Thus, introduction of next-generation RAT has been discussed by taking into consideration such matters. In the present invention, the above technology is referred to as NewRAT for convenience of description.

Figure 8:
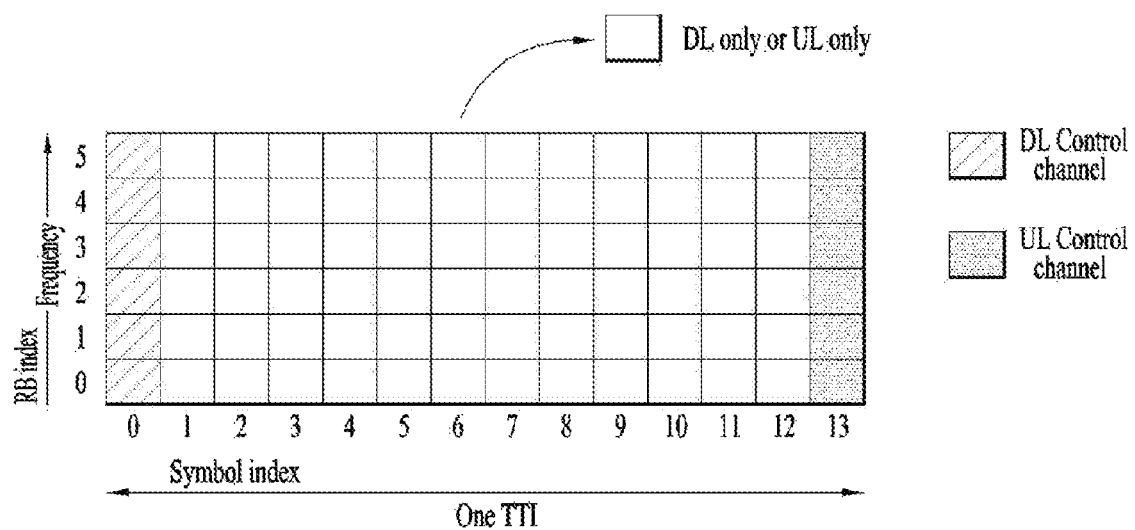
FIG. 8 illustrates the structure of an exemplary self-contained subframe.

To minimize data transmission latency in a time division duplex (TDD) system, the structure of a self-contained subframe as illustrated in FIG. 8 is considered in fifth-generation (5G) NewRAT. FIG. 8 illustrates the structure of an exemplary self-contained subframe.

In FIG. 8, the hatched area represents a DL control region and the black area represents a UL control region. The area having no marks may be used for either DL data transmission or UL data transmission. In this structure, DL transmission and UL transmission may be sequentially performed in one subframe to send DL data and receive UL ACK/NACK therefor in a subframe. As a result, this structure may reduce time taken to retransmit data when a data transmission error occurs, thereby minimizing the latency of final data transmission.

In such a self-contained subframe structure, a time gap is required in order for the eNB and the UE to switch from a transmission mode to a reception mode or from the reception mode to the transmission mode. To this end, some OFDM symbols at the time of switching from DL to UL in the subframe structure may be set as a guard period (GP).

Examples of the self-contained subframe type that may be configured/set in the system operating based on NewRAT may consider at least four subframe types as follows.

DL control period+DL data period+GP+UL control period
DL control period+DL data period
DL control period+GP+UL data period+UL control period
DL control period+GP+UL data period FIG. 9 illustrates a detailed configuration example of a self-contained subframe. Particularly, in FIG. 9, Dc means a DL symbol for DL control channel transmission and Dd means a DL symbol for DL data channel transmission. Uc means a UL symbol for UL control channel transmission, Ud means a UL symbol for UL data channel transmission, and GP means a symbol for a guard period between DL and UL.

Referring to FIG. 9, a total of 9 self-contained subframe configurations including configuration #0 to configuration #8 is illustrated for example. Particularly, CSI-RS means a reference signal received symbol for measuring CSI at a UE side and SRS means a symbol for sounding reference signal transmission at the UE side.

As OFDM, which is equally applied to DL, has been introduced as a UL multi-antenna transmission scheme of NewRAT, frequency selective scheduling is considered even on UL. According to this scheduling, the UE may transmit UL data using a different sideband (SB) PMI per SB within a scheduled RB. Hereinafter, a description will be given of an SB PMI indication method to reduce overhead when the eNB indicates the SB PMI to the UE using DCI which is a UL grant.

<Overhead Reduction Method of UL SB PMI Indication>

Since the overhead reduction method of UL SB PMI indication may differ according to a UL codebook structure, a description of the method is separately given according to the codebook structure. However, a PMI indication method in a single codebook may also be used in a PMI indication method in a dual codebook and, conversely, the PMI indication method in the dual codebook may also be used in the PMI indication method in the single codebook.

UL Single-Codebook Case

First, a UL single-codebook refers to the case in which a single codebook is used for a PMI.

1) Option 1: Codebook subset restriction (CSR) for SB PMI set indication

As a first method for reducing overhead of SB PMI indication, the eNB informs the UE of CSR and indicates an SB PMI only within a restricted codebook subset. As a result, a payload size for SB PMI indication may be reduced. CSR may be indicated through RRC or MAC level signaling.

However, if the codebook subset is semi-statically restricted, it is difficult to represent an accurate channel using the codebook subset when a channel dynamically varies with time. Therefore, a codebook subset suitable for a current channel may be desirably indicated through the DCI. For example, if the eNB transmits the DCI, which is the UL grant, by being divided into two DCIs, i.e., a first DCI and a second DCI (this DCI design is referred to as a two-level DCI or a separate DCI), to the UE, the first DCI carries codebook subset information and the second DCI indicates an SB PMI within the codebook subset. The first DCI carries most of information transmitted through a legacy LTE UL grant, for example, resource allocation information, and the second DCI carries SB PMI information.

Conversely, the first DCI carries wideband (WB)/long-term related information, for example, a WB PMI or the codebook subset information and the second DCI carries final scheduling information such as the SB PMI or resource allocation. Since an increase in overhead of the first DCI is inevitable when the codebook subset information is added to the first DCI, candidates of the codebook subset may be predefined through RRC/MAC level signaling to reduce overhead and one of the candidates may be indicated through the first DCI.

Likewise, even in a single DCI structure, candidates of the codebook subset may be predefined through RRC/MAC level signaling and one of the candidates may be indicated through a single DCI. An SB PMI defined within the single DCI is indicated within a designated codebook subset. If the payload size of the SB PMI varies with candidates, since the UE has difficulty in decoding the single DCI, the candidates of the codebook subset need to be represented using the same bitwidth. For example, if two subsets are defined, the number of codewords of subset 1 (i.e., the number of elements of a codebook or a subset size) should be set to be equal to the number of codewords of subset 2. Alternatively, even if the codewords of subset 1 and subset 2 are not equal in number, the respective subsets should be represented using the same bitwidth. For example, if the number of codewords of subset 1 is 2 and the number of codewords of subset 2 is 4, the bitwidth of the SB PMI (i.e., 2 bits) is designated based on the maximum number, 4, of the codewords. In the case of the single DCI, if CSR is designated through RRC/MAC signaling, the payload size of the SB PMI and the payload size of the single DCI are determined to match a subset size.

Only when there are many scheduled RBs, for example, only when the number of scheduled RBs is equal to or larger than K, the codebook subset may be used and, otherwise, the SB PMI may be indicated in the entire codebook because there are few SB PMIs. Herein, K may be indicated by the eNB to the UE through RRC signaling.

Additionally, the range of scheduled RBs may be predetermined. For example, range 1 may be defined as the case in which the scheduled RBs are equal to or less than 10 RBs, range 2 may be defined as the case in which the scheduled RBs exceed 10 RBs and are equal to or less than 20 RBs, and range 3 may be defined as the case in which the scheduled RBs exceed 20 RBs. A codebook subset to be used may be differently designated according to these ranges. A codebook subset of each range is semi-statically designated by the eNB for the UE through RRC/MAC signaling. For example, in a range including many scheduled RBs, the codebook subset is configured to be small so that the payload size of the SB PMI may be reduced.

2) Option 2: Indication of remaining SB PMIs in a PMI set including highly correlated PMIs based on a PMI of a specific SB (e.g., the first SB in scheduled RBs).

Codewords defined in a codebook may be grouped according to a highly correlated degree. In a channel having remarkably high frequency selectivity, SB PMIs for two adjacent SBs have a low correlation but, otherwise, there is a correlation between SB PMIs for two adjacent SBs. In this case, an SB PMI of a specific SB (hereinafter, a reference PMI) is indicated in the entire codebook and the remaining SB PMIs are indicated in a codebook subset including highly correlated PMIs with the reference PMI. To this end, a plurality of PMI sets including highly correlated precoders is preconfigured and the eNB may indicate the configured PMI sets to the UE. The remaining SB PMIs are indicated in a set in which the reference PMI is present among the plural sets.

Alternatively, in designing the codebook, adjacent PMIs are designed to have highly correlated PMIs and PMIs adjacent to the reference PMI are indicated as the remaining SB PMIs. That is, each SB PMI is defined as reference PMI+delta index. The delta index is indicated as, for example, one of $\{2, 1, 0, -1\}$ corresponding to 2 bits. The bitwidth of the delta index and a value of the delta index corresponding thereto may be indicated in advance by the eNB to the UE.

Alternatively, the proposed method may be used such that the reference PMI is not be fixed to one PMI and an i-th SB PMI configures an SB PMI immediately before the i-th SB PMI, i.e., an (i−1)-th SB PMI, as the reference PMI. Herein, the first SB PMI having no reference PMI should be indicated in the entire codebook.

3) Option 3: Configuring a PMI set including highly correlated precoders based on a WB PMI and indicating an SB PMI within the configured set.

A WB PMI, which is a PMI commonly applied to all scheduled RBs, is indicated in the entire codebook and the remaining SB PMIs are indicated in a codebook subset including highly correlated PMIs with the WB PMI. To this end, a plurality of PMI sets including highly correlated precoders may be preconfigured and the eNB may indicate the PMI sets to the UE. The remaining SB PMIs are indicated in a set in which the WB PMI is present among the plural sets.

Alternatively, in configuring the codebook, adjacent PMIs may be designed to have a high correlation and PMIs adjacent to the WB PM may be indicated as the remaining SB PMIs. For example, each SB PMI is defined as WB PMI+delta index and the delta index is indicated as one value among {2, 1, 0, −1} corresponding to 2 bits. The bitwidth of the delta index and the value of the delta index corresponding thereto may be indicated in advance by the eNB to the UE. Since the WB PMI is used as the reference PMI even when a different PMI per SB is actually used, the WB PMI should always be transmitted to the UE.

In a situation in which frequency selectivity is high, an SB PMI exiting from the periphery of the WB PMI (i.e., an SB PMI having a low correlation with the WB PMI) may be optimally selected. Therefore, since it may be inefficient to configure one WB PMI as the reference PMI, multiple middle band (MB) PMIs may be used as the reference PMI. An MB PMI covers a frequency band which is smaller than the entire band and includes a plurality of SBs. The entire band includes a plurality of MBs and the eNB informs the UE of an MB PMI corresponding to each MB. In an MB band to which the MB PMI is applied, the SB PMI is indicated by an MB PMI thereof as the reference PMI. That is, the MB PMI, instead of the WB PMI, is configured as the reference PMI and the SB PMI is indicated using the proposed method.

UL Multi-Codebook Case

The UL multi-codebook case is a method of representing one final PMI using a plurality of PMIs. For example, in LTE release-10, a W1 PMI and a W2 PMI are used. Generally, W1 indicates a PMI of a long-term/WB attribute and W2 indicates a PMI of a short-term/SB attribute.

To reduce overhead of the SB PMI, the eNB may indicate one WB W1 to be commonly applied to all SBs and indicate W2 per SB, to the UE. Alternatively, the eNB may indicate WB W1 and WB W2 and indicate only SB W2 per SB without indicating W1 and an SB PMI may be indicated to the UE using WB W1 and SB W2. Hereinafter, in order to further reduce a payload size of the W2 PMI transmitted per SB, the following schemes may be considered.

Scheme 1—Co-Phase Only Indication for SB PMI

W2 serves as a selector for configuring a co-phase between a horizontal-polarity (H-pol) antenna group and a vertical-polarity (V-pol) antenna group and selecting partial beams from among beam groups defined in W1. In this case, if the same selector is applied to a plurality of SB PMIs and a co-phase per SB PMI is differently applied, overhead of an SB W2 PMI may be reduced. For example, the eNB indicates a reference W2 PMI to the UE in consideration of both the selector and the co-phase. The eNB indicates only the co-phase for the remaining SB PMIs under the assumption that the SB PMIs have the same selector value as the reference PMI. The reference PMI may be an SB PMI for a specific SB or may be a WB PMI.

(2) Scheme 2—Selector Only Indication for SB PMI

As opposed to Scheme 1, the eNB indicates only a selector value for the remaining SM PMIs under the assumption that the co-phase of the reference PMI has the same value as the co-phase of the remaining SB PMIs.

(3) Scheme 3—CSR-Based SB PMI

CSR-based PMI set restriction of the above-described single-codebook structure may be applied to W2. That is, a codebook subset may be indicated and W2 may be indicated only in the subset so that overhead may be reduced. In consideration of frequency selectivity, if frequency selectivity is high, the eNB may set a codebook subset of W2 to be high to raise resolution and, if frequency selectivity is low, the eNB may set the codebook subset of W2 to be low to lower resolution.

(4) Scheme 4—A scheme in which a PMI set including highly correlated precoders is configured based on an SB PMI of a specific SB (e.g., the first SB in a scheduled RB) and the remaining SB PMIs is indicated in the PMI set may be considered. In LTE standardization, if a dual codebook of W1 and W2 is used, a scheme of indicating only W2 without indicating W1 is under discussion. In this case, application of different BF to each transmit antenna port (i.e., a beamformed CSI-RS port) is discussed and port selection may be performed through W2. As a result of port selection, a transmit beam is selected.

Scheme 4 may be usefully used for W2 only indication together with a UL beamformed SRS. The eNB may reduce overhead for SB PMI indication by applying a highly correlated beam to adjacent SRS ports. The eNB indicates as one port in the entire codebook as the reference PMI and restricts a W2 codebook set such that only adjacent ports based on the port selected as the reference PMI are selected as the remaining adjacent PMIs. For example, if N beamformed SRS resources are configured for the UE, the eNB indicates one of the N SRS resources as an SRS reference indicator (SRI) for the UE. The UE should check the number of SRS ports indicated through the SRI to use a codebook corresponding to the number of the ports.

More specifically, if SRS port 1 to port 4 are configured on the indicated SRS resource, a specific port is indicated as a reference W2 PMI and the remaining SB W2 PMIs are restricted to be selected only in ports adjacent to the port selected in the reference W2 PMI. That is, if the reference W2 PMI selects port 1, an SB W2 PMI is restricted to select one of port 1 and port 2 which is adjacent to port 1.

In recent NewRAT (NR), a triple codebook obtained by extending an existing dual codebook is discussed and introduction of W3 corresponding to an antenna panel selector in addition to W1 and W2 is under consideration. Similarly to W1, W3 may have a long-term/WB attribute and, similarly to WB W1, single WB W3 which is commonly applied to all SBs is indicated to the UE. That is, the eNB indicates WB W1 and WB W3 by extending a scheme of indicating W1. Alternatively, if W3 has a short-term/SB attribute, WB W1 and WB W2, corresponding to W3, may be commonly applied to all SBs and only W3 may be indicated per SB. Alternatively, a co-phase of W2 and W3 may be signaled per SB in a combination with Scheme 1 and selectors of W1 and W2 may be commonly applied to all SBs as WB information.

Similarly, Scheme 2 may be combined with the indication scheme of W3. Alternatively, similarly to Scheme 3, a payload size may be reduced through CSR for W3. Alternatively, W2 and W3 may be signaled per SB without reducing overhead. In this case, since W2 and W3 are selected from the entire codebook, the payload size may be large but a PMI may be more accurately indicated.

Information as to which of the above schemes will be used may be indicated by the eNB to the UE through DCI/MAC/RRC signaling. For example, in the two-level DCI structure, an indicator for selecting Scheme 1 or Scheme 2 may be defined in the first DCI and an SB PMI suitable for the selected scheme may be defined in the second DCI.

In the above-described schemes, the codebook subset of the SB PMI is commonly restricted based on the WB PMI or the reference PMI and the SB PMI is indicated within the restricted subset. If the eNB restricts the codebook subset and does not indicate the SB PMI, the UE may interpret this as application of precoding cycling within the subset. In this case, the UE transmits UL data using a semi-open loop MIMO transmission scheme.

<Indication for Granularity of UL SB>

Another factor for determining overhead for SB PMI indication is an SB size. That is, since the number of SBs decreases as the SB size increases, fewer SB PMIs are indicated. As a result, overhead for SB PMI indication is reduced. The eNB may determine the SB size in consideration of a tradeoff between a frequency selectivity degree and SB PMI overhead and inform the UE of the determined size. Basically, the eNB may UE-specifically indicate the SB size through RRC/MAC level signaling. The payload size of DCI in which the SB PMI is included is determined according to the SB size.

More desirably, the SB size may be dynamically configured through the DCI and, as a result, high scheduling flexibility may be secured. If information about the SB size is transmitted in the DCI, the UE is not aware of the payload size of the DCI before decoding the DCI, DCI decoding is problematic. To solve this problem, the two-level DCI structure may be used. For example, the SB size is designated in the first DCI having no SB PMI information and the payload size of the second DCI may be calculated according to the SB size. As a result, the UE is accurately aware of the payload sizes of the first DCI and the second DCI and the DCI decoding problem is solved.

Separately from the SB size in the first DCI, a 1-bit indicator indicating whether an SB PMI is used or a WB PMI is used may be configured. Alternatively, selection of the SB PMI or the WB PMI may be indicated through the SB size without an additional indicator. That is, if the SB size is configured as a WB, the UE uses the WB PMI instead of frequency selective scheduling using the SB PMI. Therefore, whether scheduling is performed using the WB PMI or the SB PMI may be indicated according to the SB size.

Alternatively, an SB PMI mode or a WB PMI mode may be implicitly indicated according to scheduled RB size information in the DCI without separating signaling an indicator for the SB PMI mode or the WB PMI mode. For example, it may be determined that, when the number of scheduled RBs is K or more (or less), the SB PMI mode may be configured and, otherwise, the WB PMI mode may be configured. K is indicated by the eNB to the UE through RRC/MAC level signaling.

The UE performs the following operation in each of the WB PMI mode and the SB PMI mode.

Use of WB PMI

Since the second DCI in which the SB PMI is carried is unnecessary information, the UE does not blind-decode the second DCI or disregards information about the SB PMI in the second DCI. If the WB PMI is used, an SB related DCI field (e.g., a field indicating the SB size) in the first DCI may be treated as dummy data (e.g., zero padding) or may be overridden for other information transmission. Similarly, even when a single DCI, rather than two-level DCI, is used, the SB related DCI field (e.g., the SB size) may be subjected to zero padding by being treated as the dummy data or is overridden for other information transmission.

Use of SB PMI

SB precoding is applied by detecting the SB size through the field indicating the SB size and receiving information on the SB PMI of the second DCI.

Alternatively, whether scheduling is performed using the WB PMI or the SB PMI is semi-statically indicated by the eNB to the UE through RRC/MAC level signaling and the UE blind-decodes the DCI under the assumption that a DCI payload size differs according to the WB/SB PMI mode. In the WB PMI mode, since the SB PMI related field (e.g., the SB size) is not present in the first DCI, the payload size decreases and the second DCI is not received. In the SB PMI Mode, since the SB PMI related field (e.g., the SB size) is present in the first DCI, the payload size increases and the second DCI is received. In the case of a single DCI rather than two-level DCI, the SB PMI related field may or may not be present according to the WB/SB PMI mode and the payload size varies.

Even if the SB PMI mode is configured, as the SB size is dynamically indicated, the UE may operate in the WB PMI mode by configuring the SB size as a WB. Therefore, even if the SB PMI mode is semi-statically configured, the WB PMI mode and the SB PMI mode may be dynamically switched.

Alternatively, whether scheduling is performed using the WB PMI or the SB PMI may be identified by the UE through blind detection without signaling. DCI structures and DCI payload sizes for the WB PMI mode and the SB PMI mode differ and the UE blind-detects DCI for the WB PMI mode and DCI for the SB PMI mode. As a result, the UE may dynamically schedule the WB PMI and the SB PMI without separate control information.

For example, in the two-level DCI structure, if the UE succeeds in blind-detecting the first DCI and the second DCI, the UE transmits data using the SB PMI. If the UE succeeds in blind-detecting the first DCI and fails to blind-detect the second DCI, the UE transmits data using the WB PMI. As another example, in a single-DCI structure, the UE individually blind-detects a single DCI assuming the WB PMI (i.e., short DCI without the SB PMI related field) and a single DCI assuming the SB PMI (i.e., long DCI with the SB PMI related field) and transmits data through the WB or SB PMI according to a blind detection result.

FIG. 10 illustrates an example of performing UL transmission according to an embodiment of the present invention. Particularly, FIG. 10 illustrates an example in which UE1 to UE3 existing in one cell transmit UL data through FDM.

Referring to FIG. 10, UE1 transmits UL data in SB 0, SB 1, and SB 4, UE2 transmits UL data in SB 2 and SB 5, and UE3 transmits UL data in SB 3. In this case, UE1 and UE2 use optimized precoding for each SB using an SB PMI. Hereinafter, when UL scheduling is performed as illustrated in FIG. 10, DCI which is a UL grant that the eNB signals to the UE will be described.

FIG. 11 illustrates an exemplary structure of a UL grant according to an embodiment of the present invention.

Referring to FIG. 11, UE1 and UE2 receive UE-specific first DCI and common second DCI and UE3 receives only the UE-specific first DCI. SB PMIs for all bands are defined in the common DCI and the UE using the SB PMIs discovers an SB PMI for an SB scheduled therefor after decoding resource allocation information of the first DCI.

A WB modulation and coding scheme (MCS) and an SB MCS are present in the first DCI. The WB MCS indicates an MCS applied to data when the WB PMI is applied and the SB MCS indicates an MCS applied to data when the SB PMI is applied. Since the UE that has failed to decode the second DCI uses the WB PMI in the first DCI, the UE transmits data by applying the WB MCS. On the other hand, since the UE that has succeeded in decoding the second DCI uses the SB PMI in the second DCI, the UE transmits data by applying the SB MCS.

Herein, whether the UE has used the SB PMI and the SB MCS by successfully decoding the second DCI or has used the WB PMI and the WB MCS by failing to decode the second DCI may be ambiguous in terms of the eNB. Then, the eNB should attempt to decode data with respect to each of two assumptions.

Alternatively, in order to solve ambiguity, the eNB may not transmit the two MCSs. Instead, the eNB transmits only the WB MCS when the WB mode is set to ON and transmits only the SB MCS when the WB mode is set to OFF. If the WB mode is set to OFF in the first DCI received by the UE but the UE fails to decode the second DCI, the UE does not transmit data or transmits data using the SB MCS and the WB PMI.

Since the SB PMI is transmitted in the common DCI, if the bitwidth of W2 differs per UE like the case in which a rank differs per UE, each UE may not be aware of a payload size of the common DCI and therefore cannot decode the DCI. To solve this problem, information about the bitwidth of the SB PMI is indicated in the first DCI. Upon receiving the SB size and the information about the bitwidth of the SB PMI, the UE calculates the payload of the second DCI to blind-detect the second DCI.

If UE1 and UE2 transmitting UL data in the same subframe differ in SB size, the payloads of the second DCI calculated by the respective UEs differ and thus the UEs fail to decode the second DCI. Therefore, the eNB should equally configure the SB sizes of the two UEs.

The WB mode is an indicator indicating whether the WB PMI is used or the SB PMI is used. When WB mode=ON, the UE does not decode the second DCI and transmits data using the WB PMI and the WB MCS in the first DCI. In FIG. 11, it is assumed that the WB mode of UE3 is set to ON. UE1 and UE2 in which the WB mode is set to OFF use the SB PMI by decoding the second DCI and transmit data using the SB MCS. If UE1 and UE2 fail to decode the second DCI, the UEs transmit data inevitably using the WB PMI and the WB MCS. Even if the WB mode is set to OFF, the WB PMI may still be used to determine the SB PMI as in the proposed method. (For example, since a codebook subset in which the SB PMI is indicated by using the WB PMI as a reference PMI is determined, the WB PMI is still needed. Alternatively, if the WB PMI is defined as W1 and the SB PMI is defined as W2, W1 is also used to determine the SB PMI.)

Since the first DCI is UE-specific, CRC masking is applied using a UE ID and the DCI may be received in a UE-specific search space. On the other hand, since the second DCI is decoded by multiple UEs, CRC masking is applied using a third common ID rather than a UE ID and the DCI may be received in a common search space. The common ID is indicated by the eNB to the UE through RRC signaling.

The two-level DCI of FIG. 11 is advantageous in that control signal overhead is reduced since the second DCI is shared by multiple UEs. When the second DCI is defined with respect to each UE, a plurality of second DCIs should be transmitted and thus control signal overhead increases. The two-level DCI of FIG. 11 may be useful when single-user (SU) MIMO UEs transmit UL data through FDM. However, if multi-user (MU) MIMO is applied in one SB/RB, the two-level DCI may be inappropriate.

The first DCI and the second DCI of FIG. 11 may be restricted to be transmitted at the same timing, i.e., in the same subframe. However, the first DCI and the second DCI may be transmitted in different subframes for freedom of operation of the eNB. In this case, the first DCI should be transmitted at an earlier timing than the second DCI so that the UE may decode the second DCI. The transmission timing of the second DCI may be designated in the first DCI. Alternatively, the transmission timing of the second DCI may be designated to be transmitted in an arbitrary subframe within a specific subframe window based on a reception timing of the first DCI or to be transmitted after n fixed subframes based on the reception timing of the first DCI. In addition, the first DCI may indicate a search space of the second DCI or restrict a search space range of the second DCI so that UE complexity may be lowered.

FIG. 12 illustrates another exemplary structure of a UL grant according to an embodiment of the present invention.

In FIG. 12, UE1 and UE2 receive UE-specific first DCI and UE-specific second DCI and UE3 receives only the UE-specific first DCI. In the UE-specific second DCI, SB PMIs for all bands are not present and only SB PMIs for scheduled SB for the UE are present. The SBs scheduled for the UE are indicated through resource allocation information of the first DCI.

The UE distinguishes SBs using one of two schemes described below using the resource allocation information of the first DCI.

Scheme A distinguishes SBs according to SB sizes in all SBs regardless of scheduled RBs. For example, if all bands are 10 RBs and the SB size is 2 RBs, SBs are divided in units of 2 RBs starting from a low frequency so that a total of 5 SBs is present. If the lowest frequency RB is set to RB 0 and RBs are counted by increasing an RB index according to increase in frequency, SB 0 to SB 4 are configured as RB (0,1), RB (2,3), RB (4,5), RB (6,7), and RB (8,9), respectively. In this case, if scheduled RBs are RBs 0, 1, 3, 4, and 9, the UE recognizes SB0, SB1, SB2, and SB4 as SBs thereof and an SB PMI per SB is indicated. Since the definition of the SB is determined regardless of resource allocation, different SB PMIs are indicated although allocated RB 3 and RB 4 are adjacent to each other. In order to apply the same SB PMI to the allocated adjacent RBs, scheme B is applied.

Scheme B is a scheme of recognizing RBs as one SB if the RBs are contiguous in units of an SB size. For example, if the SB size is 2 and scheduled RBs are RB 0, RB 1, RB 3, RB 4, and RB 9, the UE detects the SB in order of an allocated low RB index and recognizes RBs present between RB i and RB (SB size—1) as one SB. That is, the UE recognizes RB 0 and RB 1 as one SB, i.e., SB 0, recognizes RB 3 and RB 4 as one SB, i.e., SB 1, and recognizes RB 9 as SB 2. In Scheme B, SB PMIs corresponding to a total of three SBs are indicated to the UE and an SB is adaptively defined with respect to a scheduled RB, which is effective.

Only the WB MCS is present in the first DCI. A UE in which the WB mode is set to ON or a UE in which the WB mode is set to OFF and decoding of the second DCI fails transmits data using the WB MCS and the WB PMI. If a UE in which the WB mode is set to OFF successfully receives the second DCI, the UE transmits data using the SB PMI and SB MCS information in the second DCI. Since the second DCI in which the SB information is carried is UE-specifically defined, the SB size may be differently defined per UE.

Operation in the WB mode is identical to that described with reference to FIG. 11. In addition, since both the first DCI and the second DCI are UE-specific, the two DCIs are CRC-masked using UE IDs.

The DCI structure of FIG. 12 may also be used even when MU-MIMO is performed in the same RB/SB. For example, if UE 4 and UE 1 are subjected to MU MIMO for SB 0 and SB 1, then SB 0 and SB 1 are scheduled for UE 4 in DCI of UE 4 and the UE4 transmits data by detecting PMIs and MCSs for SB0 and SB1 in the second DCI thereof.

As described with reference to FIG. 11, since whether the UE has used the SB MCS or the WB MCS may be ambiguous in terms of the eNB even in FIG. 12, such ambiguity is solved using a method similar to the method proposed in FIG. 11. If the WB mode is set to ON, the eNB transmits the WB MCS through the first DCI and, if the WB mode is set to OFF, the eNB transmits the SB MCS through the first DCI. If the WB mode is set to OFF in the first DCI received by the UE but the UE fails to decode the second DCI, the UE does not transmit data. Alternatively, the UE transmits data using the SB MCS and the WB PMI included in the first DCI. However, as the UE uses the WB PMI instead of the SB PMI, MCS mismatch occurs. In addition, if the UE is subjected to MU-MIMO, this affects other UEs, thereby adversely affecting UL data reception of other UEs.

As compared with FIG. 11, in FIG. 12, a payload of a CRC etc. increases as the second DCI is transmitted per UE. However, in the structure of FIG. 12, MU MIMO transmission may be performed, SB PMI bitwidth information is not required in the first DCI, and the SB size may be differently designated per UE.

Although the first DCI and the second DCI of FIG. 12 may be restricted to be transmitted at the same timing, i.e., in the same subframe, the first DCI and the second DCI may be transmitted in different subframes for freedom of operation of the eNB. In this case, the first DCI should be transmitted at an earlier timing than the second DCI so that the UE may decode the second DCI. A transmission timing of the second DCI may be designated in the first DCI. Alternatively, the transmission timing of the second DCI may be designated to be transmitted in an arbitrary subframe within a specific subframe window based on a reception timing of the first DCI or to be transmitted after n fixed subframes based on the reception timing of the first DCI. In addition, the first DCI may indicate a search space of the second DCI or restrict a search space range of the second DCI so that UE complexity may be lowered. For example, the two DCIs are restricted in the same aggregation level and the second DCI may be designated to be present on the next resource immediately after a resource on which the first DCI is present in a search space.

Thus, when the DCI is divided into two (or multiple) DCIs, WB mode signaling serves to indicate whether the second DCI is present or not or whether the UE should blind-detect the second DCI. That is, WB mode signaling may be interpreted as information as to whether the second DCI is present.

The case in which the UE-specific DCI is divided into two DCIs as in FIGS. 12 to 14 may be modified such that two DCI payloads are concatenated to be defined as one DCI. For convenience of description, the case in which the example of FIG. 12 is modified to be defined as one DCI is described.

After a CRC of the first DCI, a second DCI payload is concatenated to be defined as a single DCI. The payload size of this single DCI is determined to an SB size which is an original first DCI field and SB PMI bitwidth information so that the UE has difficulty in performing blind detection. Therefore, the UE does not blind-detect and decode the entire single DCI and blind-detects/decodes only a first DCI payload present in the single DCI. Since a CRC of the first DCI is present in the first DCI payload, whether the UE has succeeded in performing decoding may be confirmed through CRC check. If the UE has successfully decoded the first DCI payload, the UE identifies the payload size of the second DCI based on the SB PMI related information in the first DCI and attempts to decode up to the second DCI payload constituting the single DCI. CRC check of the second DCI payload may be performed through CRC information of the second DCI.

Additionally, in order to reduce payload, exclusion of a CRC part of the second DCI from the single DCI may be considered. Since only SB PMI information is present in the second DCI, even if a decoding error occurs, this does not greatly affect scheduling and thus the CRC may be omitted.

FIG. 13 illustrates another exemplary structure of a UL grant according to an embodiment of the present invention.

In FIG. 13, all of UE1 to UE3 receive UE-specific first DCI and UE-specific second DCI. All SB PMIs for all bands are present in the UE-specific second DCI. Among the SB PMIs, an SB scheduled for the UE is indicated through resource allocation information of the first DCI. In a structure in which the two DCIs are transmitted at the same timing or the first DCI is transmitted at an earlier timing than the second DCI and then the second DCI is received, it is desirable to compactly transmit the second DCI as illustrated in FIG. 12.

However, when the second DCI is received first and then the first DCI is received later, DCI design as illustrated in FIG. 13 is effective. UE scheduling has not been completed at a timing at which the second DCI is received and therefore the UE and the eNB are not aware of which SB is scheduled. Herein, the eNB previously informs the UE of SB PMI information for each SB and informs the UE of SB PMI information for all bands because the UE is not aware of which SB is scheduled. After receiving the second DCI, the UE receives the first DCI. If the WB mode is set to OFF, an SB PMI present in the second DCI for a scheduled SB is used. If the WB mode is set to ON, the UE disregards the SB PMI of the second DCI and transmits UL data using a WB PMI present in the first DCI.

A transmission timing of the first DCI may be designated in the second DCI. Alternatively, the transmission timing of the first DCI may be determined to be transmitted in an arbitrary subframe in a specific subframe window based on a reception timing of the second DCI or may be determined to be transmitted after n fixed subframes based on the reception timing of the second DCI. Multiple first DCIs may be associated with one second DCI to generate UL scheduling. For example, the second DCI may be received at a timing n and then two first DCIs may be received at timings n+1 and n+2. The first DCI received at the timing n+1 and the first DCI receiving at the timing n+2 may commonly use the SB PMI information of the second DCI received at the timing n, thereby generating scheduling.

The eNB configures the specific subframe window for the UE and semi-statically indicates the specific subframe window through higher layer signaling (e.g., RRC/MAC signaling). The multiple first DCIs transmitted within the specific subframe window secure SB PMIs with reference to the same second DCI.

The second DCI may indicate a search space of the first DCI or restrict a search space range of the first DCI, thereby lowering UE complexity. For example, the two DCIs may be restricted to the same aggregation level and the first DCI may be determined to be present on a resource immediately after a resource on which the second DCI is present in the search space.

An MCS of the first DCI indicates a WB MCS if the WB mode is set to ON and indicates an SB MCS if the WB mode is set to OFF. The SB size is present in the first DCI in FIG. 12 but is not present in FIG. 13. The SB size is indicated through RRC/MAC level signaling or determined by being tied with the entire bandwidth value.

In FIG. 13, if a rank is transmitted in the first DCI, the payload of an SB PMI in the second DCI varies according to the rank. However, since the second DCI is received prior to the first DCI, the UE fails to decode the second DCI. Therefore, the payload of the SB PMI may be desirably determined irrespective of the rank of the first DCI. For example, the bitwidth of the SB PMI is configured under the assumption that a rank is configured to maximize a codebook size of the SB PMI. After the rank is indicated by receiving the first DCI, the SB PMI present in the second DCI is interpreted to match the rank.

Alternatively, the rank may be indicated through DCI/RRC/MAC level signaling rather the first DCI. Alternatively, the bitwidth of the SB PMI or the SB size may be indicated through DCI/RRC/MAC level signaling rather than the first DCI so that the UE may calculate the payload size.

In order for the UE to correctly interpret the SB PMI, since rank information is needed, the eNB may indicate the rank information in the second DCI rather than the first DCI. As a result, the UE may interpret the SB PMI in the second DCI to match the rank without the aid of the first DCI.

When a dual codebook is used, the SB PMI (=SB W2) is calculated under the assumption of one WB W1. Therefore, WB W1 should be additionally defined in the second DCI. Even when a single codebook is used, if a codebook subset of the SB PMI is determined based on the WB PMI, the WB PMI should be additionally defined in the second DCI. Thus, if the WB PMI is defined in the second DCI, the same problem as a problem arising when the payload of the SB PMI differs according to the rank occurs even in the payload of the WB PMI. To solve this issue, the above proposed solution is applied to the WB PMI.

In FIGS. 11 and 12, if a UE in which a WB mode is set to OFF fails to decode the second DCI, occurrence of ambiguity in MCS configuration has been mentioned and a solution thereof has been proposed. As an additional solution, in FIG. 13, the eNB indicates an aperiodic SRS request in the second DCI. If the UE has successfully decoded the second DCI, the UE transmits an SRS in response to the SRS request and the eNB may be aware of whether the second DCI has been successfully decoded according to whether the SRS has been received. As a result, ambiguity of MCS configuration is solved. If the eNB fails to receive the SRS, the eNB determines that the UE has failed to decode the second DCI. Then, the eNB transmits WB MCS information in the first DCI and indicates that WB mode=ON. If the eNB receives the SRS, the eNB determines that the UE has successfully decoded the second DCI. Then, the eNB transmits SB MCS information in the first DCI and indicates WB mode=OFF. In this case, since the SRS is used to check whether the DCI has successfully been decoded, the SRS is restricted to use a single port so that SRS overhead is reduced.

If the dual codebook is used in FIGS. 11 to 13, the WB PMI represents WB W1 and WB W2 and the SB PMI represents SB W2. If the single codebook is used, the WB PMI represents WB W and the SB PMI represents SB W.

FIG. 14 illustrates another exemplary structure of a UL grant according to an embodiment of the present invention.

In FIG. 14, a first DCI may include information for decoding an SB PMI of a second DCI, such as a codebook subset for WB PMI information, long-term information (e.g., rank), or the SB PMI, an SB PMI bitwidth, and an SB size. The second DCI may indicate instantaneous scheduling information and the SB PMI.

The second DCI may be determined to be transmitted at the same timing as the first DCI or to be transmitted after the first DCI is received. A transmission timing of the second DCI may be determined to be designated in the first DCI. Alternatively, the transmission timing of the second DCI may be determined to be transmitted in an arbitrary subframe in a specific subframe window based on a reception timing of the first DCI or may be determined to be transmitted after n fixed subframes based on the reception timing of the first DCI.

Multiple second DCIs are associated with one first DCI and thus UL scheduling may occur. For example, the UE may receive the first DCI at a timing n and then receive two second DCIs at a timing n+1 and n+2. Both the second DCI received at the timing n+1 and the second DCI received at the timing n+2 may commonly use information of the first DCI received at the timing n, thereby generating scheduling.

The eNB configures the specific subframe window for the UE and semi-statically indicates the specific subframe window through higher layer signaling. Multiple first DCIs transmitted within the specific subframe window secure an SB PMI with reference to the same second DCI.

A search space of the second DCI may be indicated in the first DCI or a search space range of the second DCI may be restricted so that UE complexity may be lowered. For example, the two DCIs may be restricted to the same aggregation level and the second DCI may be determined to be present on a resource immediately after a resource on which the first DCI is present in the search space.

If resource allocation information and an SB PMI are defined in the same DCI as illustrated in FIG. 14, the two information may be joint-encoded to perform more efficient DCI design. For example, when the resource allocation information is defined in units of a resource block group (RBG), if each of the resource allocation information and the SB PMI is encoded, the resource allocation information and the SB PMI are defined as follows. For convenience of description, it is assumed that an RBG size is equal to an SB size.

The resource allocation information is defined as a bitmap. Whether resource allocation is performed is defined by one bit per SB (=RBG). If the SB PMI is two bits per SB, tone of 4 PMIs may be designated. As a result, a total of 3 bits per SB is needed. Assuming that the RBG size is equal to the SB size, if the resource allocation information and the SB PMI, having 3 bits per SB, are joint-encoded, then one state among 8 states may be defined as no resource allocation and the remaining 7 states may be designated as 7 PMIs. Therefore, much information (i.e., PMIs) may be represented using the same bitwidth.

Assuming that the SB size doubles the RBG size, if the resource allocation information and the SB PMI are independently encoded, two bits per SB are used for the resource allocation information and two bits per SB are used to designate the PMI. Consequently, a total of 4 bits per SB is needed.

If the resource allocation information and the SB PMI are joint-encoded with 4 bits per SB, one state among 16 states may be defined as the case in which no resource allocation is performed for all of RBGs constituting the SB. 5 states among the remaining 15 states are designated as 5 PMIs used when resource allocation is performed only for the first RBG. Another 5 states are designated as 5 PMIs used when resource allocation is performed only for the second RBG. The last 5 states may be designated as 5 PMIs used when resource allocation is performed for both RBGs. Accordingly, much information (i.e., more PMIs) is represented using the same bitwidth.

In a single DCI structure, UL scheduling/grant information is present in one DCI. In this case, the SB PMI information may be explicitly indicated using a specific field in the single DCI or may be implicitly indicated without being defined in the DCI. Hereinafter, for the latter case, an implicit SB PMI indication scheme will be described.

In a situation in which DL/UL reciprocity is satisfied, the UE may estimate a UL channel through a DL RS and determine UL precoding by itself. The UE may transmit a UL precoded SRS by applying precoding determined thereby so that the UE may cause the eNB to be aware of a UL effective channel to which precoding is applied. That is, the UE estimates the UL channel using the DL RS, calculates an SB PMI, and transmits the precoded SRS using the calculated SB PMI. The eNB commands the UE to transmit UL data to which a WB PMI is finally applied or commands the UE to transmit the UL data using the SB PMI applied to the SRS, in consideration of the effective channel and a network situation. That is, since signaling for a WB mode is present in the DCI but information indicating which SB PMI is used is not present, a payload size of the DCI may be reduced.

Whether DL/UL reciprocity is satisfied is determined by the eNB. If reciprocity is satisfied, the eNB causes an implicit SB PMI indication scheme to be ON and, otherwise, the eNB causes an explicit SB PMI indication scheme to be ON. An explicit SB PMI may be a single DCI structure or a two-level DCI structure, including an SB PMI indicator. Alternatively, the UE may determine whether DL/UL reciprocity is satisfied and inform the eNB of the determined result. Then, the eNB may indicate a finally selected scheme of the implicit scheme and the explicit scheme to the UE.

Even though the UE may estimate a UL channel through reciprocity, a rank should be determined based on a UL SINR. This is because the UE has difficulty in estimating the UL SINR and thus it is desirable for the eNB to make this determination. Since assumption for the rank is needed to determine the SB PMI, the eNB needs to pre-inform the UE of the number of ranks through DCI/MAC/RRC level signaling and the UE should determine the SB PMI suitable for the rank. In addition, since the number of ports of the precoded SRS is determined according to the rank, rank information between the UE and the eNB should be shared in the form of DCI/MAC/RRC level signaling prior to a transmission timing of the precoded SRS.

Since the rank should be determined prior to a transmission timing of DCI which is a UL grant, the scheme is disadvantageous in that the rank may not be instantaneously determined. To perform instantaneous rank determination, a rank when a WB PMI is used in the DCI which is a UL grant may be defined and the eNB may command the UE to transmit the UL data using the WB PMI. Alternatively, rank N less than rank M of the precoded SRS (i.e., rank M of a precoder applied to the precoded SRS) in the DCI which is the UL grant is indicated again and the UE transmits UL data using first to N-th column vectors in a rank-M precoding matrix.

Specifically, the UE transmits first to M-th dominant singular vectors for the UL channel by applying BF to SRS port 1 to port M, respectively, and performs SB precoding for UL data using the first to N-th dominant singular vectors transmitted by applying BF to SRS port 1 to port N for subsequently received rank-N information. Alternatively, the eNB informs the UE of N SRS ports selected from among M SRS ports and the UE transmits the UL data using a beam applied to port N. The value of M may be designated by the eNB to the UE through RRC/MAC signaling or may always be fixed to a UL full rank value without signaling.

Alternatively, the UE calculates an SB PMI per rank and transmits all precoded SRSs per rank. The eNB receives the precoded SRSs per rank to estimate an effective channel per rank and finally determines a UL rank to indicate the determined UL rank through a (single) DCI which is the UL grant. Although SRS overhead increases in this scheme, the eNB may be aware of all optimized effective channels per rank and dynamically determine an optimal rank based on the effective channels.

Alternatively, the UE transmits a non-precoded SRS and the eNB estimates a UL channel using the non-precoded SRS. The eNB schedules the UE using the SB PMI and informs the UE of scheduling information such as a rank, resource allocation information, or an MCS through the DCI which is the UL grant but does not inform the UE of SB PMI information. The UE detects the SB PMI from the UL channel calculated using channel reciprocity and transmits the UL data using the SB PMI. In the DCI which is the UL grant, if the WB mode is set to ON, the UE calculates and then applies a WB PMI or uses the WB PMI designated in the DCI. If the WB mode is set to OFF, the UE calculates and then applies an SB PMI. If the WB mode is set to ON, the eNB should indicate a WB MCS in the DCI and, if the WB mode is set to OFF, the eNB should indicate an SB MCS in the DCI.

If the eNB indicates, to the UE, the SB PMI only for an SB corresponding to a scheduled RB, the payload of the SB PMI may vary according to the size of the scheduled RB. As a result, the payload size of the DCI in which the SB PMI is included varies. If the SB PMI and the resource allocation information are transmitted through one DCI, the UE has difficulty in decoding the DCI. To solve this problem, a method in which the payload of the SB PMI is fixed and the SB size varies according to the scheduled RB is discussed. For example, if the payload of the SB PMI is fixed to N bits (e.g., N=20), the scheduled RBs are 10 RBs, and the SB PMI is 2 bits for one SB, the SB size is set to 1 RB and thus SB PMIs for a total of 10 SBs are transmitted. If the scheduled RBs are 20 RBs and the SB PMI for one SB is 2 bits, the SB size is set to 2 RBs and thus SB PMIs for a total of 10 SBs are transmitted.

A total DCI payload size N for SB PMI transmission is configured by the eNB through RRC signaling. The eNB may configure a large value as N to reduce the SB size and receive feedback for an accurate SB PMI. Conversely, the eNB may configure a small value as N to reduce DCI payload. Even in a scheme in which all SB PMIs for all bands are transmitted through the DCI, the total DCI payload size N for SB PMI transmission is configured by the eNB through RRC signaling. In this case, if an SB PMI for one SB is k bits, the number L of SBs is determined to be a flooring value of N/k and an SB size O is determined to be a minimum integer value O satisfying the relationship of total M RB bandwidths<L*O.

The eNB may indicate only information about SB PMIs for scheduled RBs for the UE. The remaining SB PMIs do not need to inform the UE because the remaining SB PMIs are irrelevant to data scheduling of the UE. A method is proposed in which if the size of allocated resources of the UE is small (e.g., scheduled RBs<N), all UL scheduling information including a UL SB PMI is also transmitted through a single DCI and, otherwise, the SB PMI and the other UL scheduling information are transmitted through different DCIs. If scheduled RBs are large, SBs increase and, therefore, the payload of the SB PMI increases. In this case, if all scheduling information is included in one DCI, DCI coverage is problematic. That is, a UE located at a cell boundary or a UE having a low SNR may fail to decode the DCI.

Accordingly, if the scheduled RBs are large, it is necessary to separately transmit the SB PMI through an independent DCI. Since the size of the scheduled RBs is known after the UE decodes the DCI having resource allocation information, the DCI having the resource allocation information should always include an x-bit SB PMI field. If scheduled RBs<N as a result of checking the resource allocation information, the SB PMI field in the DCI includes valid SB PMI information. If the scheduled RBs are equal to or greater than N RBs, the SB PMI field of the DCI is filled with dummy data (e.g., all zeros) and the UE blind-detects the independent DCI including the SB PMI.

Figure 15:
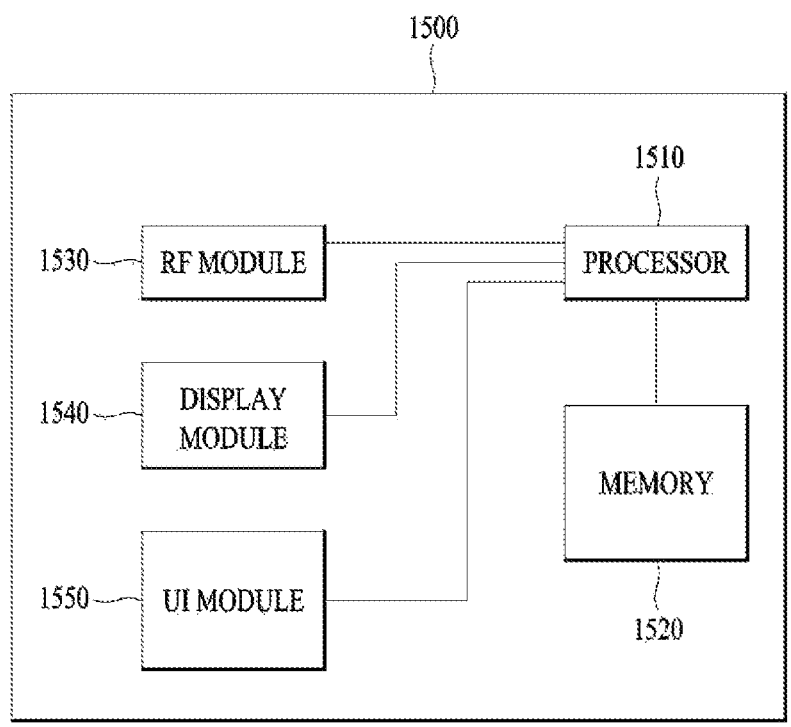
FIG. 15 is a block diagram of a communication apparatus according to an embodiment of the present invention.

FIG. 15 is a block diagram of a communication apparatus according to an embodiment of the present invention.

Referring to FIG. 15, a communication apparatus 1500 includes a processor 1510, a memory 1520, a Radio Frequency (RF) module 1530, a display module 1540 and a user interface module 1550.

The communication apparatus 1500 is shown for convenience of description and some modules thereof may be omitted. In addition, the communication apparatus 1500 may further include necessary modules. In addition, some modules of the communication apparatus 1500 may be subdivided. The processor 1510 is configured to perform an operation of the embodiment of the present invention described with respect to the drawings. For a detailed description of the operation of the processor 1510, reference may be made to the description associated with FIGS. 1 to 14.

The memory 1520 is connected to the processor 1510 so as to store an operating system, an application, program code, data and the like. The RF module 1530 is connected to the processor 1510 so as to perform a function for converting a baseband signal into a radio signal or converting a radio signal into a baseband signal. The RF module 1530 performs analog conversion, amplification, filtering and frequency up-conversion or inverse processes thereof. The display module 1540 is connected to the processor 1510 so as to display a variety of information. As the display module 1540, although not limited thereto, a well-known device such as a Liquid Crystal Display (LCD), a Light Emitting Diode (LED), or an Organic Light Emitting Diode (OLED) may be used. The user interface module 1550 is connected to the processor 1510 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, a base station may be substituted with such a terminology as a fixed station, a Node B, an eNode B (eNB), an access point (AP) or the like.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method of performing DL scheduling in units of a subband in the next-generation wireless communication system and the apparatus therefor have been described focusing upon an example applied to a 3GPP LTE system, the present invention is applicable to various wireless communication systems in addition to the 3GPP LTE system.

The invention claimed is:

1. A method of transmitting an uplink signal by a user equipment (UE) to a base station (BS) in a wireless communication system, the method comprising:
receiving, from the BS, first downlink control information (DCI) including information about resource blocks allocated in a wideband (WB) and second DCI including information about precoders indicated in units of a subband (SB);
configuring the allocated resource blocks as SBs including two or more contiguous resource blocks; and
transmitting, to the BS, the uplink signal through the SBs, by applying the precoders to corresponding SBs,
wherein a WB modulation and coding scheme (MCS) and a WB precoding matrix indicator (PMI) are included in the first DCI, and a SB MCS and SB PMIs are included in the second DCI,
wherein, based on the UE being configured to use the SB PMI for the transmission of the uplink signal and succeeding in the reception of the second DCI, the SB MCS and a corresponding SB PMI included in the second DCI are used for the transmission of the uplink signal,
wherein, based on the UE being configured to use the SB PMI for the transmission of the uplink signal and failing in the reception of the second DCI, the WB MCS and the WB PMI included in the first DCI are used for the transmission of the uplink signal, and
wherein the first and the second DCI are received through a same subframe and are configured based on a same aggregation level.

2. The method of claim 1,
wherein the configuring the allocated resource blocks as the SBs includes defining, as one SB, resource blocks of contiguous indexes which are equal to or less than a predetermined number from a resource block of a minimum index not configured as a SB among the allocated resource blocks.

3. The method of claim 2,
wherein if a resource block of an index which is contiguous with the resource block of the minimum index not configured as a SB is not present among the allocated resource blocks, the resource block of the minimum index is defined as one SB.

4. The method of claim 1,
wherein the first and the second DCI are UE specific DCI.

5. The method of claim 1,
wherein the first DCI includes information about a size of SBs defined as the number of resource blocks.

6. A user equipment (UE) in a wireless communication system, the UE comprising:
a wireless communication module; and
a processor connected to the wireless communication module and configured to:
receive, from the BS, first downlink control information (DCI) including information about resource blocks allocated in a wideband (WB) and second DCI including information about precoders indicated in units of a subband (SB),
configure the allocated resource blocks as SBs including two or more contiguous resource blocks, and
transmit, to the BS, the uplink signal through the SBs, by applying the precoders to corresponding SBs,
wherein a WB modulation and coding scheme (MCS) and a WB precoding matrix indicator (PMI) are included in the first DCI, and a SB MCS and SB PMIs are included in the second DCI,
wherein, based on the UE being configured to use the SB PMI for the transmission of the uplink signal and succeeding in the reception of the second DCI, the SB MCS and a corresponding SB PMI included in the second DCI are used for the transmission of the uplink signal,
wherein, based on the UE being configured to use the SB PMI for the transmission of the uplink signal and failing in the reception of the second DCI, the WB MCS and the WB PMI included in the first DCI are used for the transmission of the uplink signal, and
wherein the first and the second DCI are received through a same subframe and are configured based on a same aggregation level.

7. The UE of claim 6,
wherein the processor defines, as one SB, resource blocks of contiguous indexes which are equal to or less than a predetermined number from a resource block of a minimum index not configured as a SB among the allocated resource blocks.

8. The UE of claim 7,
wherein if a resource block of an index which is contiguous with the resource block of the minimum index not configured as a SB is not present among the allocated resource blocks, the resource block of the minimum index is defined as one SB.

9. The UE of claim 6,
wherein the first and the second DCI are UE specific DCI.

10. The UE of claim 6,
wherein the first DCI includes information about a size of SBs defined as the number of resource blocks.

* * * * *